Aug. 2, 1955    B. B. MINNIUM    2,714,239

METHOD OF FIRING CERAMIC PLATES

Filed Dec. 9, 1952

INVENTOR
Byron B Minnium
BY Ralph Hammar
ATTORNEY

2,714,239
METHOD OF FIRING CERAMIC PLATES

Byron B. Minnium, Erie, Pa., assignor to Erie Resistor Corporation, Erie, Pa., a corporation of Pennsylvania Application December 9, 1952, Serial No. 324,935

2 Claims. (Cl. 25—157)

In electronic circuits such as used in radio and television there is a substantial demand for thin flat vitrified ceramic dielectric plates or disks for the manufacture of circuit components including one or more capacity elements. Such ceramic plates have heretofore been made by firing flat in a single layer on previously fired ceramic supports or saggers. The plates cannot be fired in multiple layers because they stick together at the firing temperature. The plates are so thin as to be unstable when supported on edge. Because the plates are brittle it is necessary that the plates be flat so as to avoid breakage during the coating operations. This invention is intended to produce thin flat ceramic plates. The plates are fired on edge with previously fired spacers between each of the unfired plates and although neither the ceramic plates nor the spacers are thick enough to be stable when supported on edge the combined stack of unfired ceramic plates and fired spacers can be supported on edge and the individual plate will remain upright during firing.

Figure 1:
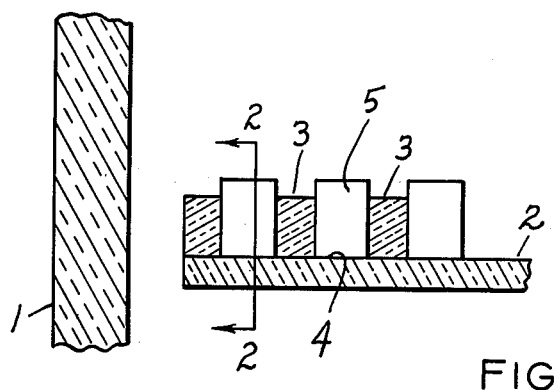
Figure 2:
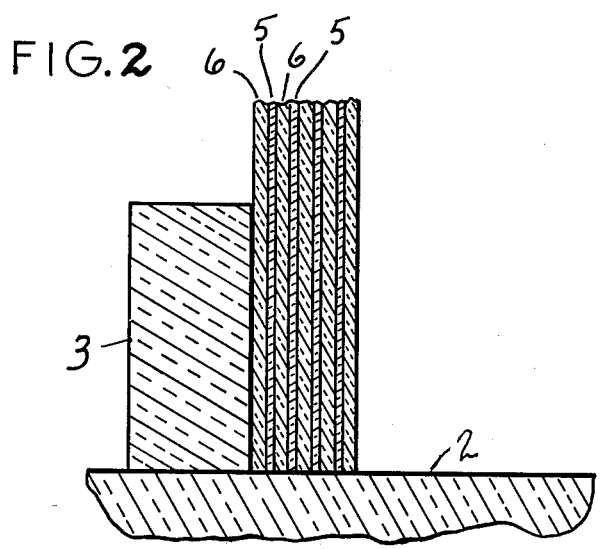
Figure 4:
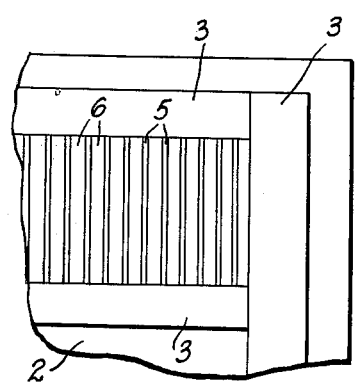
Figure 3:

In the drawing Fig. 1 is a fragmentary section through a ceramic kiln showing the structure for firing the ceramic plates, Fig. 2 is a section on line 2—2 of Fig. 1 on a greatly exaggerated scale i. e. 4:1, Fig. 3 is a perspective of one of the spacer plates which is two or more times as thick as the unfired plates 5, and Fig. 4 is a top plan view, partly broken away, of part of the sagger and the plates supported thereon.

In the drawing 1 indicates one of the outside walls of a ceramic kiln, 2 indicates a fired ceramic plate or sagger which has mounted thereon spaced ceramic bars 3 for defining troughs 4 for receiving unfired ceramic plates 5. The construction and manner of heating the kiln are not illustrated as these are not important.

As shown more clearly in Fig. 2, the unfired ceramic plates 5 which may be either round or square are supported on their bottom edges on the sagger 2. The unfired plates are stacked between alternate fired ceramic plates or spacers 6. The unfired ceramic plates 5 are so thin that it would be impossible to independently stand or support the plates on edge. These unfired plates after firing will have a thickness of from 10 to 20 thousandths of an inch. Even if it were theoretically possible to balance such thin plates on edge on a perfectly plane surface, it is practically impossible under the conditions present in the ceramic kiln. The sagger 2 being of fired ceramic is not perfectly plane nor will the edges of the plates 5 necessarily be perfectly square. The other dimensions of the plates 5 are so much greater than the thickness of the plates that the plates will not be stable when edge supported. Likewise, the fired ceramic spacers 6 are not stable when edge supported. These spacers will ordinarily be about 40 thousandths of an inch thick, the added thickness making the spacers less fragile.

Prior to loading in the sagger, the green unfired plates 5 and the fire spacers 6 are arranged alternately in a stack with a spacer 6 between each pair of unfired plates 5 and with the spacers and unfired plates being in face to face engagement. While the individual elements of the stack are too thin to be stable when supported on edge, the stack can be loaded and handled as a unit and will be stable when supported on the sagger as shown. This is so with round as well as with the rectangular plates illustrated. During loading of the stack, the plates and spacers are in contact with each other and can even be under endwise pressure. When loaded, the stack is confined by the bars 3 at the sides and ends of the stack. This keeps the plates and spacers in line.

During firing, the plates 5 shrink and the cumulative shrinkage along the length of the stack may cause the plates to tip. This tipping, in the absence of the spacers 6 would cause adjacent plates 5 to stick together thereby making both plates unusuable. However, when each of the unfired plates 5 is interleaved between fired spacers 6, tipping of the plate 5 against the spacer does not result in sticking. As the plates 5 approach the temperature of vitrification, the plates become quite soft and have little mechanical strength. At this temperature there is a shrinkage of approximately 30% so that clearance will develop between the plates 5 and the spacers 6. Because the spacers 6 do not shrink, the shrinkage is distributed along the length of the stack and the spacers tend to remain in place in the stack both laterally and longitudinally. From one aspect, each pair of spacers in conjunction with the ceramic bars 3 engaging the side edges of the spacers provides a pocket for the intermediate unfired plate 5. Since the ceramic bars 3 and spacers 6 are fired pieces, they do not undergo shrinkage during firing as do the unfired plates 5. Both of these effects combine to keep the thin plates 5 more nearly upright which is important if warpage is to be prevented. Not only is each of the plates 5 confined between two flat spacer plates but each of the plates 5 is free to move along the surface of the supporting sagger plate 2 to the extent required by thermal expansion and contraction. If the stack consisted entirely of unfired plates 5, the shrinkage along the length of the stack would be much greater and the plates would not remain in line because the bars 3 at the side of the stack would be too widely spaced after the shrinkage.

This application is a continuation in part of application S. N. 177,708 filed August 4, 1950, now abandoned.

What is claimed as new is:

1. The method of producing thin flat vitrified ceramic dielectric plates having a thickness of a small fraction of an inch and a length and width much greater than the thickness so as to be unstable when edge supported and being of material which shrinks upon firing and in which unfired pieces contacting each other during firing stick together, which comprises arranging the unfired plates in stacks with a fired ceramic spacer plate between each of adjacent unfired plates and with the unfired and spacer plates in face to face engagement and the unfired plates out of face to face engagement, loading the stacks on a sagger having a trough receiving the stacks with the bottom edges of the unfired and spacer plates resting on the sagger and supporting the plates edgewise, the sides of the trough in conjunction with the fired spacers forming pockets for the intervening unfired plates which pockets remain in place during firing both laterally and longitudinally of the stacks although the intervening unfired plates during firing shrink both laterally and longitudinally, and firing the loaded sagger in a kiln to the temperature at which the unfired plates become vitrified and would stick together unless kept out of contact with each other by the intervening spacers.

2. The method of claim 1 in which the sides of the trough which engage sides of the fired spacers in the stack comprise fired ceramic bars which rest on the sagger and in conjunction with the sagger define the trough.

References Cited in the file of this patent

UNITED STATES PATENTS

| | | |
|---|---|---|
| 614,258 | Wheeler | Nov. 15, 1898 |
| 1,739,151 | Johnson | Dec. 10, 1929 |
| 2,050,225 | Kohler | Aug. 4, 1936 |
| 2,539,446 | Lies | Jan. 30, 1951 |
| 2,582,993 | Howatt | Jan. 22, 1952 |